N. W. STORER.
OVERHEAD LINE CONSTRUCTION.
APPLICATION FILED SEPT. 10, 1909.
1,144,620.
Patented June 29, 1915.
2 SHEETS—SHEET 1.
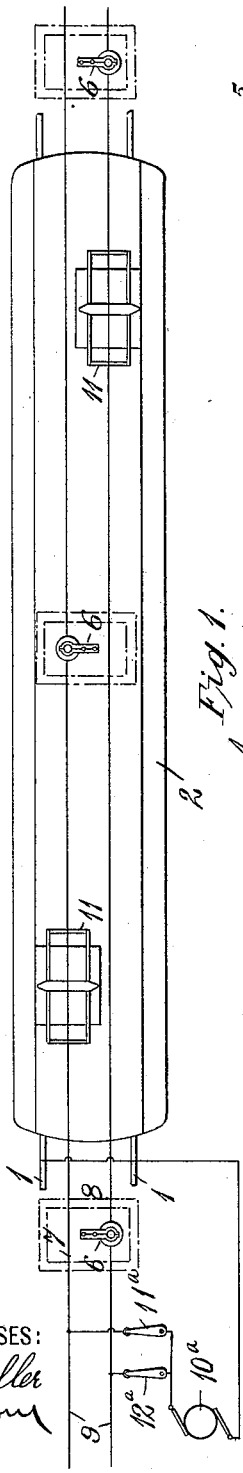
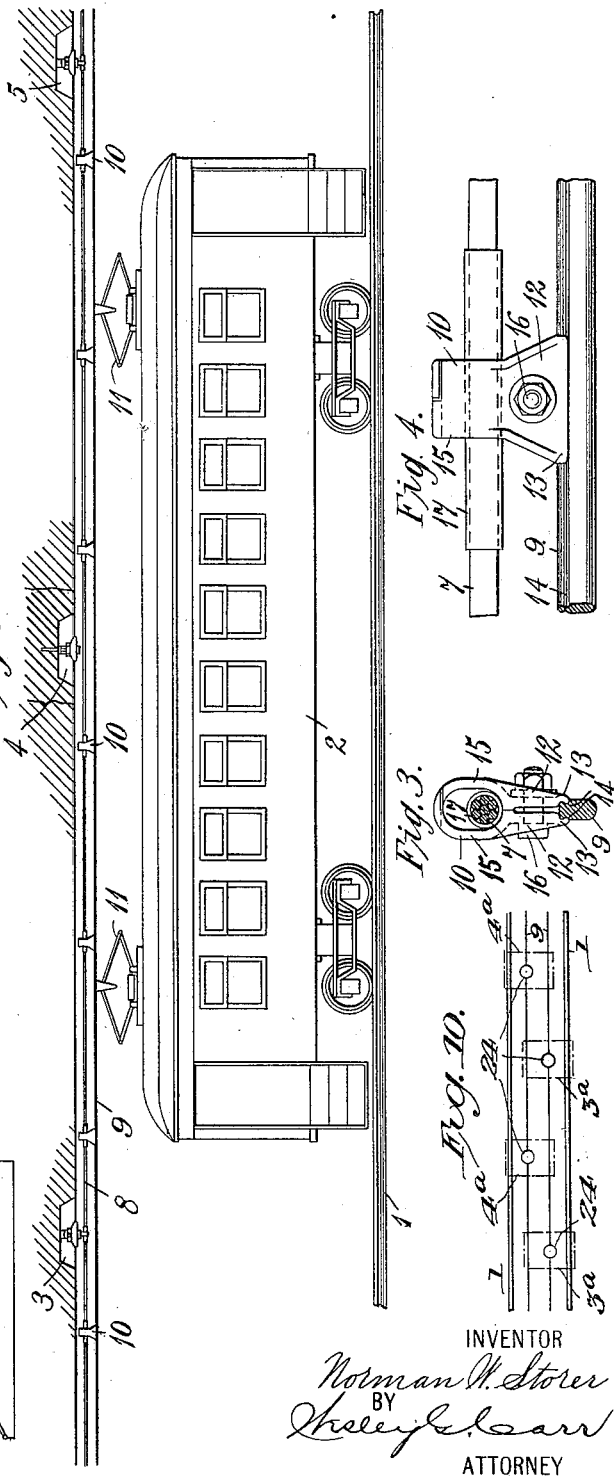
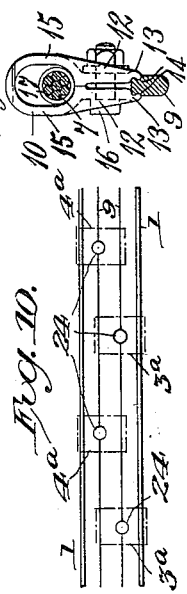
WITNESSES:
Fred H. Miller
INVENTOR
Norman W. Storer
BY
ATTORNEY
THE NORRIS PETERS CO., PHOTO-LITHO., WASHINGTON, D. C.

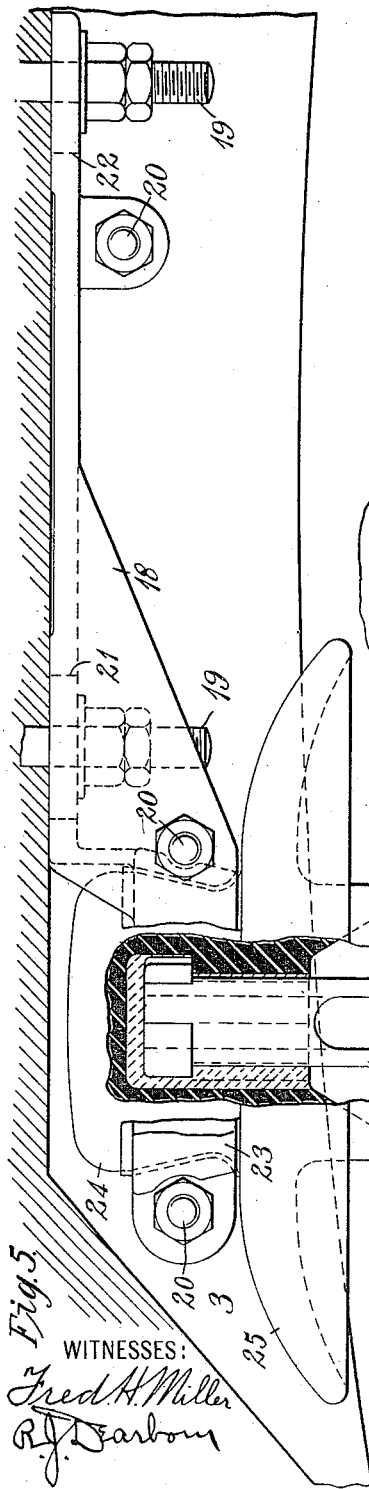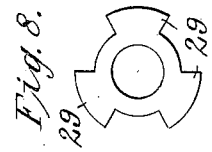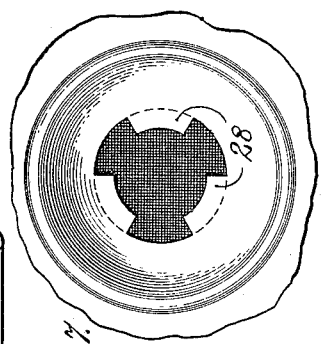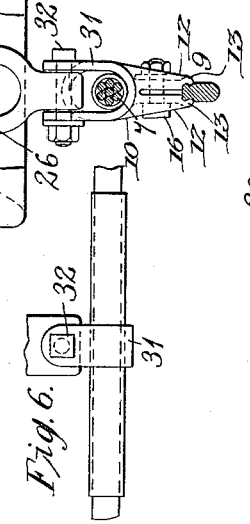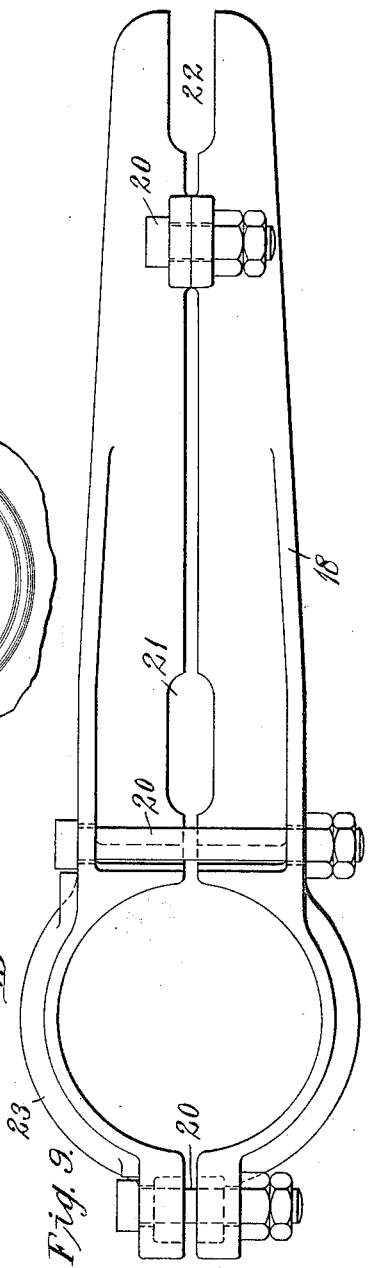

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

OVERHEAD LINE CONSTRUCTION.

1,144,620.  Specification of Letters Patent.  Patented June 29, 1915.

Application filed September 10, 1909. Serial No. 517,154.

*To all whom it may concern:*

Be it known that I, NORMAN W. STORER, a citizen of the United States, and a resident of Pittsburgh, in the county of Allegheny and State of Pennsylvania, have invented a new and useful Improvement in Overhead Line Construction, of which the following is a specification.

My invention relates to overhead line structures for electric railways, and it has special reference to such structures as are adapted for use in tunnels or in other places where the overhead room is restricted.

The object of my invention is to provide a duplicate line structure which shall be specially durable and capable of transmitting relatively large quantities of electric current to traveling contact members carried by electric vehicles operating at very high speeds.

When electric locomotives are utilized for hauling heavy passenger trains at high speeds through tunnels and in other sections where the overhead room is restricted, it is particularly desirable to so arrange the supply-line conductors as to minimize the possibility of such accidents as would interrupt the service. In addition to the foregoing, special attention should be directed to the method of line suspension, in order to avoid, as far as possible, rigidly fixing any point or points in the conductor which come directly into engagement with the trolley or traveling contact member, since the efficiency and the durability of the contact members depend largely on the smoothness and continuity of their engagement.

According to my present invention, I provide a plurality of holes or pockets in the roof of the tunnel, in which insulator brackets are mounted, and I provide two trolley conductors which are alternately supported from the brackets in successive tunnel pockets, the insulators which are supported by the brackets being alternately offset from the center of the tunnel in opposite directions. Each of the electric locomotives or cars which operate through the tunnel is provided with two independent current collectors which respectively engage the two trolley conductors. In this way, each of the trolley conductors is mechanically and electrically independent of the other and is supported from alternate tunnel pockets. Under these conditions, traffic will not be interrupted, even if one of the conductors should be so grounded or otherwise injured that it would be necessary to interrupt the energy supplied through it.

Various novel features of my improved structure will be hereinafter pointed out and set forth in the appended claims.

Figure 1 of the accompanying drawings is a partially sectional elevation of a tunnel section of an electric railroad equipped with the overhead line structure of my invention. Fig. 2 is a diagrammatic plan view of the line structure shown in Fig. 1. Figs. 3 and 4 are detail views of a clamp which is illustrative of those employed for suspending the trolley conductor from the messenger wires or cables. Fig. 5 is a partially sectional elevation of one of the tunnel pockets and its attachments, and Figs. 6, 7, 8 and 9 are detail views of the structure shown in Fig. 5. Fig. 10 is a diagrammatic plan view showing features of a modified form of my invention.

Referring to Figs. 1 and 2 of the drawings, the tunnel section here shown is provided with track rails 1 on which electric vehicles, such as a car 2, may be operated, and a plurality of tunnel pockets 3, 4 and 5 in its top wall. A bracket 6 is disposed in each of the tunnel pockets and two messenger wires or cables 7 and 8 are supported from two separate sets of brackets, the brackets of the two sets being respectively disposed in alternate tunnel pockets. From each of the messenger wires or cables, a trolley conductor 9 is suspended by means of hanger clamps 10 which are located at frequent intervals along the conductor.

Energy is supplied from any suitable source, such as a generator 10$^a$, through selective switches 11$^a$ and 12$^a$ to the conductors 9, the opposite terminal of the generator being connected to the track rails 1, in the usual manner.

A car 2, which is illustrative of any electric vehicle, is provided with two trolleys 11, preferably of the pantograph type, which respectively engage the two trolley conductors in order to maintain the electrical independence of the conductors and to minimize the possibility of temporarily interrupting the circuit connection between the supply line and the vehicle motors by reason of trolley vibrations.

Each of the suspension clamps 10 (see Figs. 3 and 4) comprises a pair of interchangeable jaw members 12 which have hook projections 13 at their lower end to engage longitudinal grooves 14 in the trolley conductor and projections 15 at the opposite end. The projections 15 coöperate with each other, and are clamped around the messenger wire or cable by a bolt 16 which serves also to clamp the hook projection into engagement with the trolley conductor. The loop which encircles the messenger cable is so constructed that there is considerable lost motion in the connection, thereby permitting a vertical adjustment of the trolley conductor as the trolley presses upwardly against it in operation. The messenger cable is protected, where it comes into engagement with the trolley clamps, by a series of short tubes 17.

Referring to Figs. 5, 6, 7, 8 and 9, a two part bracket 18 is secured to the bottom of the pocket 3 by bolts 19, and the two parts are clamped together by bolts 20. Recesses 21 and 22, which receive the bolts 19, are so arranged and proportioned that a slight adjustment of the bracket is permitted. The bracket is provided with a loop or collar projection 23 which is offset from the center of the tunnel (the bolts 19 being spaced at equal distances from the central plane thereof) and is adapted to receive an insulator 24 having a body portion which is enlarged at its upper end and a skirt or bell 25 which is integral therewith.

The body portion of the insulator is hollow and a hanger rod 26 is cemented into the recess or is otherwise rigidly secured to the insulator, which serves to electrically separate it from the metal bracket. In order to make the joint between the hanger rod and the insulator particularly solid, I prefer to utilize an insulator having inwardly extending projections 28 (see Fig. 7), the upper end of the hanger rod being provided with similar outwardly extending projections 29 to engage therewith. In assembling the insulator and the hanger rod, the latter is inserted and turned through a slight angle in order to bring the projections 29 and 28 into engagement. The parts are then rigidly set in cement.

The messenger wire or cable is suspended from the lower end of the hanger rod by means of a loop or clevis 31, a bolt 32 being thrust through the arms of the clevis and through the lower end of the hanger rod.

In each of the tunnel pockets which are adjacent to the pocket shown in Fig. 5, a bracket, similar to the bracket 18, is reversely disposed, so that the center line of the insulator and the hanger rod are located at a corresponding distance to the other side of the central plane of the tunnel.

The trolley clamps are so located that the point of connection between the messenger cable and the hanger rod 26 lies at equal distances from the two adjacent clamps. By this means, a maximum flexibility of the overhead conductor is obtained, while it is possible to limit the adjustment of the trolley, in order to avoid contact with the tunnel, by placing the messenger cable under considerable tension.

While the structure here illustrated embodies centrally-located tunnel pockets 3, 4 and 5 and laterally disposed bracket arms 6 that project in opposite directions in alternation to provide supports for two side-by-side sets of insulators 24 and suspension bolts 19, it will be understood that two side-by-side sets of pockets 3ª and 4ª in staggered relation, having vertically disposed insulators 24 and suspension bolts 19, as shown in Fig. 10, would be within the scope of my invention.

Two complete and independent trolley conductors permit one conductor to be entirely cut out of circuit without interrupting the operation of trains or cars in the tunnel or over the electrified section of the road where they are used, thereby obviating the necessity for a sectionalized line in which any one short trolley section is capable of being cut out without disturbing the remaining sections.

Various modifications in the arrangement and structural details shown in the drawings may be effected within the spirit and scope of my invention.

I claim as my invention:

1. In an electric railway line structure, the combination with a plurality of overhead brackets extending alternately in opposite directions from the central plane of the track, insulators mounted thereon and a pair of independent messenger wires or cables suspended from alternate brackets, of two trolley wires respectively suspended from the messenger wires or cables.

2. In an electric railway line structure, the combination with a plurality of overhead brackets similarly supported and extending alternately in opposite directions from the central plane of the track, insulators supported by the brackets and a pair of messenger wires electrically separated from each other and respectively supported by alternate insulators, of two trolley conductors loosely suspended from the respective messenger wires, said brackets being divided into two similar parts which are bolted together around the insulator.

3. In a tunnel or restricted passage-way having centrally-located ceiling pockets, an electric railway structure comprising a plurality of brackets mounted in the said pockets and having laterally disposed arms that project alternately in opposite directions, insulators supported in the laterally disposed arms, suspension bolts seated in the insulators, messenger wires or cables suspended in substantially parallel lines from alternate suspension bolts, and trolley conductors loosely suspended from the respective messenger cables.

4. An electric railway line structure comprising a plurality of independent insulating supports and a pair of trolley conductors respectively suspended from alternate supports so that they are electrically separated and independently supported in operative relation to a single pair of track rails.

5. In an electric railway line structure, the combination with a plurality of independent insulating supports, a pair of messenger wires or cables respectively suspended from alternate supports whereby they are electrically separated and independently supported, of a pair of trolley conductors supported from the respective messenger cables in operative relation to a single pair of track rails.

6. In an electric railway line structure, the combination with a source of energy, of a plurality of independent insulating supports, a pair of messenger wires or cables respectively suspended from alternate supports whereby they are electrically separated and independently supported, of a pair of trolley conductors supported from the respective messenger cables in operative relation to a single pair of track rails, and means for supplying energy from said source to either one or both of said conductors.

7. An electric railway structure comprising a plurality of electrically separated trolley conductors located in operative relation to a single pair of track rails, and means disposed in staggered relation for independently and alternately supporting said conductors in position.

8. An electric railway structure comprising a plurality of electrically separated trolley conductors located in operative relation to a single pair of track rails, and of means centrally located between said conductors for alternately and independently supporting said conductors.

9. An electric railway structure comprising a plurality of electrically separated trolley conductors located in operative relation to a single pair of track rails, and a plurality of brackets located between said conductors and having members alternately projecting in opposite directions from the central line of the conductors for insulating and supporting said conductors.

10. An electric railway structure comprising a plurality of electrically separated conductors disposed in operative relation to a single pair of tracks, and insulating means located intermediate said conductors for independently and alternately supporting one conductor at one side of the central plane of said conductors and the other conductor at the other side thereof.

11. A supporting device for trolley conductors comprising an insulator, a trolley hanger secured thereto and a bracket comprising corresponding half portions which, at one end are adapted to be clamped around said insulator and which at the other end, are adapted for attachment to a support.

12. An electric railway line structure comprising a plurality of parallel conductors disposed in operative relation to a single pair of track rails and a plurality of supporting means extending alternately in opposite directions from the central plane of said conductors for separately and independently suspending said conductors.

13. In a tunnel or restricted passage-way having centrally-located ceiling pockets, an electric railway structure comprising a plurality of supporting means mounted in said pockets and having laterally disposed portions projecting alternately in opposite directions, and a pair of parallel trolley conductors disposed beneath said supporting means and severally suspended from alternate supporting means.

In testimony whereof, I have hereunto subscribed my name this 30th day of Aug., 1909.

NORMAN W. STORER.

Witnesses:
F. E. WYNNE,
B. B. HINES.

Copies of this patent may be obtained for five cents each, by addressing the "Commissioner of Patents, Washington, D. C."